US012643154B2

(12) United States Patent
Frota de Souza Filho

(10) Patent No.: US 12,643,154 B2
(45) Date of Patent: Jun. 2, 2026

(54) TOOLHOLDER HAVING A MOVABLE COOLANT PIPE

(71) Applicant: Kennametal Inc., Latrobe, PA (US)

(72) Inventor: Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 414 days.

(21) Appl. No.: 18/383,213

(22) Filed: Oct. 24, 2023

(65) Prior Publication Data

US 2025/0128334 A1     Apr. 24, 2025

(51) Int. Cl.
B23B 7/10          (2006.01)
B23B 27/10          (2006.01)

(52) U.S. Cl.
CPC .................................... B23B 27/10 (2013.01)

(58) Field of Classification Search
CPC ............ B23B 27/10; B23C 5/28; B23Q 11/10
See application file for complete search history.

(56) References Cited

U.S. PATENT DOCUMENTS

| | | | | |
|---|---|---|---|---|
| 413,354 A | 10/1889 | Upham et al. | | |
| 5,358,360 A | * 10/1994 | Mai | .................... | B23Q 11/1084 |
| | | | | 279/20 |
| 7,134,812 B2 | * 11/2006 | Beckington | .......... | B23Q 1/0036 |
| | | | | 279/20 |
| 7,785,046 B2 | * 8/2010 | Beckington | ........ | B23Q 11/1023 |
| | | | | 279/20 |

| | | | | |
|---|---|---|---|---|
| 8,123,444 B2 | * 2/2012 | Bronnimann | ...... | B23Q 11/1023 |
| | | | | 279/20 |
| 8,678,724 B2 | * 3/2014 | Lee | ........................... | B23C 5/26 |
| | | | | 279/20 |
| 8,821,085 B2 | * 9/2014 | Haimer | .................. | B23Q 11/10 |
| | | | | 409/218 |
| 9,138,847 B2 | * 9/2015 | Yeh | .................... | B23Q 11/1015 |

(Continued)

FOREIGN PATENT DOCUMENTS

| | | | | |
|---|---|---|---|---|
| CN | 2702803 Y | * | 6/2005 | |
| CN | 102481635 B | | 8/2015 | |

(Continued)

OTHER PUBLICATIONS

Jun. 4, 2025 Foreign Office Action German Application No. DE202410106694.6, 08 Pages.

*Primary Examiner* — Bayan Salone
(74) *Attorney, Agent, or Firm* — Christopher J. Owens

(57)          ABSTRACT

Toolholders that have a movable coolant pipe are described. An example toolholder has a tool body and a coolant pipe. The tool body is rotatable around a central axis and has a coolant channel, a tool body passageway, and a chamber. The chamber extends from the tool body passageway toward the coolant channel. The coolant pipe is disposed within the chamber and has a coolant pipe first end, a coolant pipe second end, and a coolant pipe portion. The coolant pipe portion extends from the coolant pipe second end toward the coolant pipe first end. The coolant pipe is movable between a resting position and a deflected position. In the resting position, the coolant pipe portion is disposed a first distance from the central axis. In the deflected position, the coolant pipe portion is disposed a second distance from the central axis that is different than the first distance.

20 Claims, 9 Drawing Sheets

(56) References Cited

U.S. PATENT DOCUMENTS

| | | | | |
|---|---|---|---|---|
| 9,216,460 B2 * | 12/2015 | Matsuda | | B23B 51/06 |
| 9,604,286 B2 * | 3/2017 | Takai | | B23B 51/06 |
| 9,616,541 B2 | 4/2017 | Haimer et al. | | |
| 10,576,551 B1 * | 3/2020 | Chen | | B23B 31/20125 |
| 10,814,406 B1 * | 10/2020 | Wang | | B23C 5/282 |
| 2003/0223831 A1 * | 12/2003 | Viens | | B23C 5/006 |
| | | | | 408/60 |
| 2004/0013480 A1 * | 1/2004 | Beckington | | B23Q 11/1076 |
| | | | | 408/61 |
| 2008/0277886 A1 * | 11/2008 | Peter | | B23B 31/001 |
| | | | | 279/60 |
| 2012/0082524 A1 | 4/2012 | Matsuda et al. | | |
| 2013/0069322 A1 * | 3/2013 | Nakai | | B23Q 11/1023 |
| | | | | 279/20 |
| 2015/0042050 A1 * | 2/2015 | Haimer | | B23Q 11/1023 |
| | | | | 279/102 |
| 2015/0174721 A1 | 6/2015 | Yeh | | |
| 2015/0321267 A1 | 11/2015 | Takai | | |
| 2016/0031016 A1 * | 2/2016 | Takai | | B23B 51/02 |
| | | | | 408/57 |
| 2016/0113069 A1 * | 4/2016 | Haimer | | H05B 6/365 |
| | | | | 219/635 |
| 2024/0307981 A1 * | 9/2024 | Kroedel | | B23B 31/30 |

FOREIGN PATENT DOCUMENTS

| | | | | | |
|---|---|---|---|---|---|
| CN | 106073910 A | * | 11/2016 | | B23B 51/06 |
| CN | 111644677 A | | 9/2020 | | |
| CN | 111644677 B | * | 9/2021 | | B23C 5/28 |
| CN | 115570404 A | * | 1/2023 | | B23Q 11/10 |
| DE | 2838434 A | * | 3/1979 | | |
| DE | 2838434 A1 | | 3/1979 | | |
| DE | 8212073 U1 | | 8/1982 | | |
| DE | 4218879 A1 | * | 12/1993 | | B23Q 11/1084 |
| DE | 4308500 A1 | * | 9/1994 | | B23B 31/02 |
| DE | 102004044267 A1 | * | 3/2006 | | B23Q 11/1023 |
| DE | 102008044996 A1 | * | 3/2010 | | B23B 31/1179 |
| DE | 102010028561 A1 | * | 11/2011 | | B23B 31/1179 |
| DE | 102010055762 A1 | * | 6/2012 | | B23B 31/028 |
| DE | 102014211412 B3 | * | 11/2015 | | B23C 5/28 |
| EP | 0092673 A2 | * | 11/1983 | | B23Q 1/0018 |
| EP | 1640091 A1 | * | 3/2006 | | B23B 31/2012 |
| EP | 1640091 B1 | | 3/2010 | | |
| EP | 2666569 A1 | * | 11/2013 | | B23B 31/1179 |
| EP | 3094437 B1 | * | 11/2017 | | B23Q 11/1023 |
| EP | 2666569 B1 | | 9/2022 | | |
| JP | H0627046 U | * | 4/1994 | | B23Q 11/1084 |
| JP | 2003266274 A | * | 9/2003 | | |
| JP | 4177079 B2 | * | 11/2008 | | |
| JP | 2010142889 A | * | 7/2010 | | |
| JP | 4772900 B2 | | 9/2011 | | |
| RU | 216182 U1 | * | 1/2023 | | |
| WO | WO-2007042020 A2 | * | 4/2007 | | B23B 31/028 |
| WO | WO-2010023412 A1 | * | 3/2010 | | B23B 31/1179 |
| WO | WO-2015107101 A1 | * | 7/2015 | | B23Q 11/1023 |
| WO | WO-2017009328 A1 | * | 1/2017 | | B23Q 11/1023 |

* cited by examiner

TOOLHOLDER HAVING A MOVABLE COOLANT PIPE

FIELD

The disclosure relates generally to the field of milling tools. More particularly, the disclosure relates to a toolholder having a movable coolant pipe.

BACKGROUND

Material removal operations generate heat at the interface between a tool and the workpiece. Typically, it is advantageous to provide coolant in the vicinity of such interface to prevent overheating of the tool and the workpiece. There are various systems and devices currently in use to address overheating and include flooding systems, jetting systems, and delivering coolant directly through a tool itself. However, each of these approaches has drawbacks. For example, flooding systems require a large amount of coolant to operate and do not limit the application of coolant to the vicinity of the interface between the tool and the workpiece. Furthermore, while jetting systems and delivering coolant through the tool itself provide a more accurate coolant delivery, these approaches do not provide any adjustment of the delivery angle during use, such as when there is an increase in a toolholder's revolutions per minute (rpm).

A need exists, therefore, for new and useful toolholders that have a movable coolant pipe.

SUMMARY

Various example toolholders that have a movable coolant pipe are described.

An example toolholder has a tool body and a coolant pipe. The tool body is rotatable around a central axis and has a tool body first end, a tool body second end, a coolant channel, a tool body passageway, and a chamber. The coolant channel extends through a portion of the tool body. The tool body passageway is defined on the tool body second end. The chamber extends from the tool body passageway to the coolant channel. The coolant pipe is attached to the tool body. The coolant pipe is disposed within the chamber and partially disposed within the tool body passageway. The coolant pipe has a coolant pipe first end, a coolant pipe second end, a coolant pipe first opening, a coolant pipe second opening, a coolant pipe passageway, and a coolant pipe portion. The coolant pipe first opening is in fluid communication with the coolant channel. The coolant pipe passageway extends from the coolant pipe first opening to the coolant pipe second opening. The coolant pipe portion extends from the coolant pipe second end toward the coolant pipe first end. The coolant pipe is movable between a resting position and a deflected position. In the resting position, the coolant pipe portion is disposed a first distance from the central axis. In the deflected position, the coolant pipe portion is disposed a second distance from the central axis that is different than the first distance.

Additional understanding of these examples can be obtained by review of the detailed description, below, and the appended drawings.

DETAILED DESCRIPTION

Figures 1, 2:
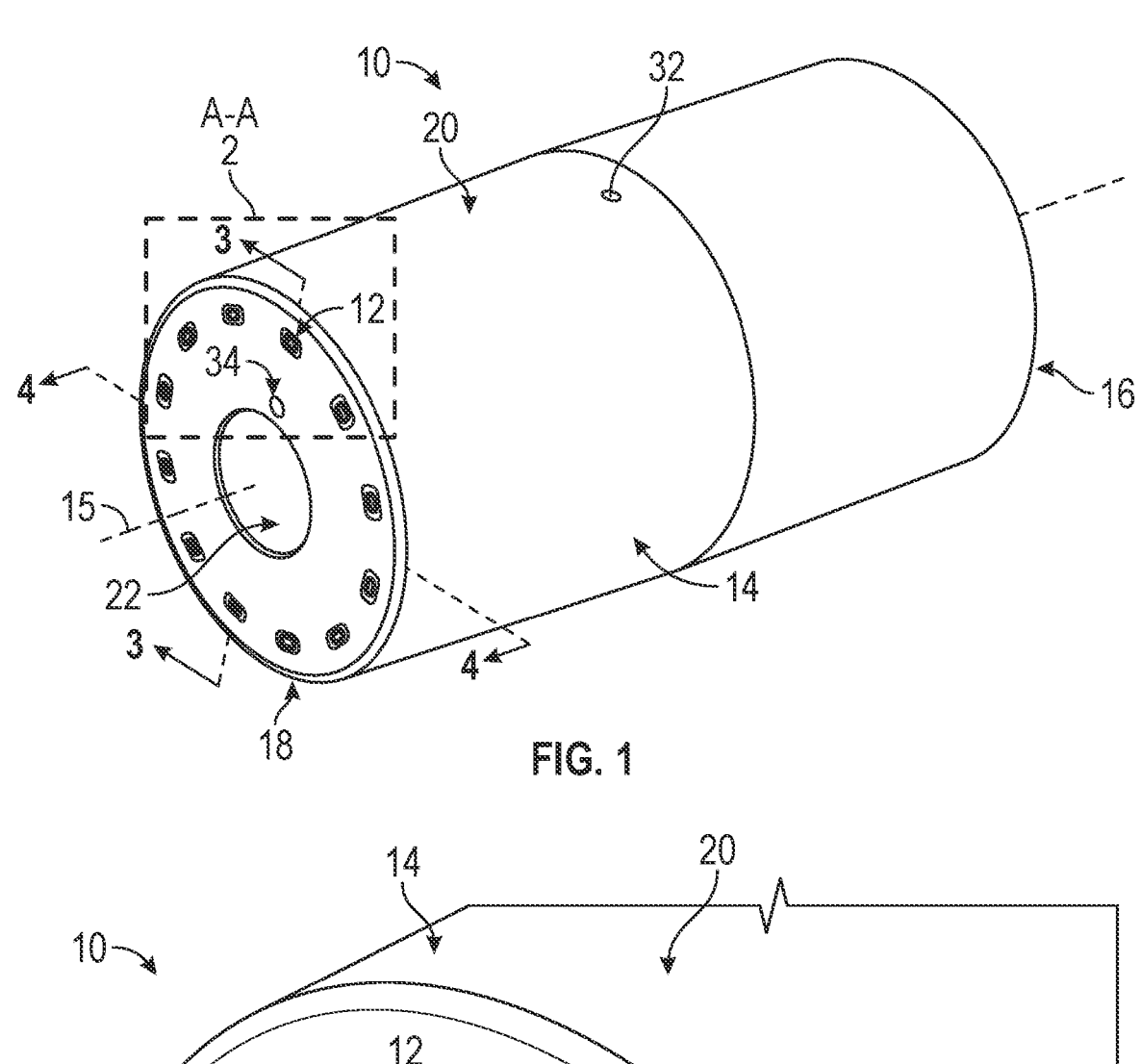
FIG. 1 is a perspective view of a first example toolholder that has a plurality of movable coolant pipes.
FIG. 2 is a magnified view of area A-A shown in FIG. 1.

The following detailed description and the appended drawings describe and illustrate various example embodiments of a toolholder that has a movable coolant pipe. The description and illustration of these examples are provided to enable one skilled in the art to make and use a toolholder that has a movable coolant pipe according to this invention. They are not intended to limit the scope of the claims in any manner.

FIGS. 1 through 7 illustrate a first example toolholder 10 that has a plurality of coolant pipes 12. The toolholder 10 has a tool body 14 and the plurality of coolant pipes 12.

The tool body 14 is rotatable around a central axis 15 and has a tool body first end 16, a tool body second end 18, a tool body sidewall 20, a central passageway 22, a coolant channel 24, a plurality of tool body passageways 26, a chamber 28, a plurality of projections 30, a first cap 32, and a second cap 34.

The central passageway 22 extends from the tool body first end 16 to the tool body second end 18. In the illustrated embodiment, the tool body 14 defines a shoulder 36 within the central passageway 22, which can be used as a mechanical stop to advancement of tool during use. However, in alternative embodiments, a shoulder can be omitted from a tool body.

Figures 3, 4, 5:
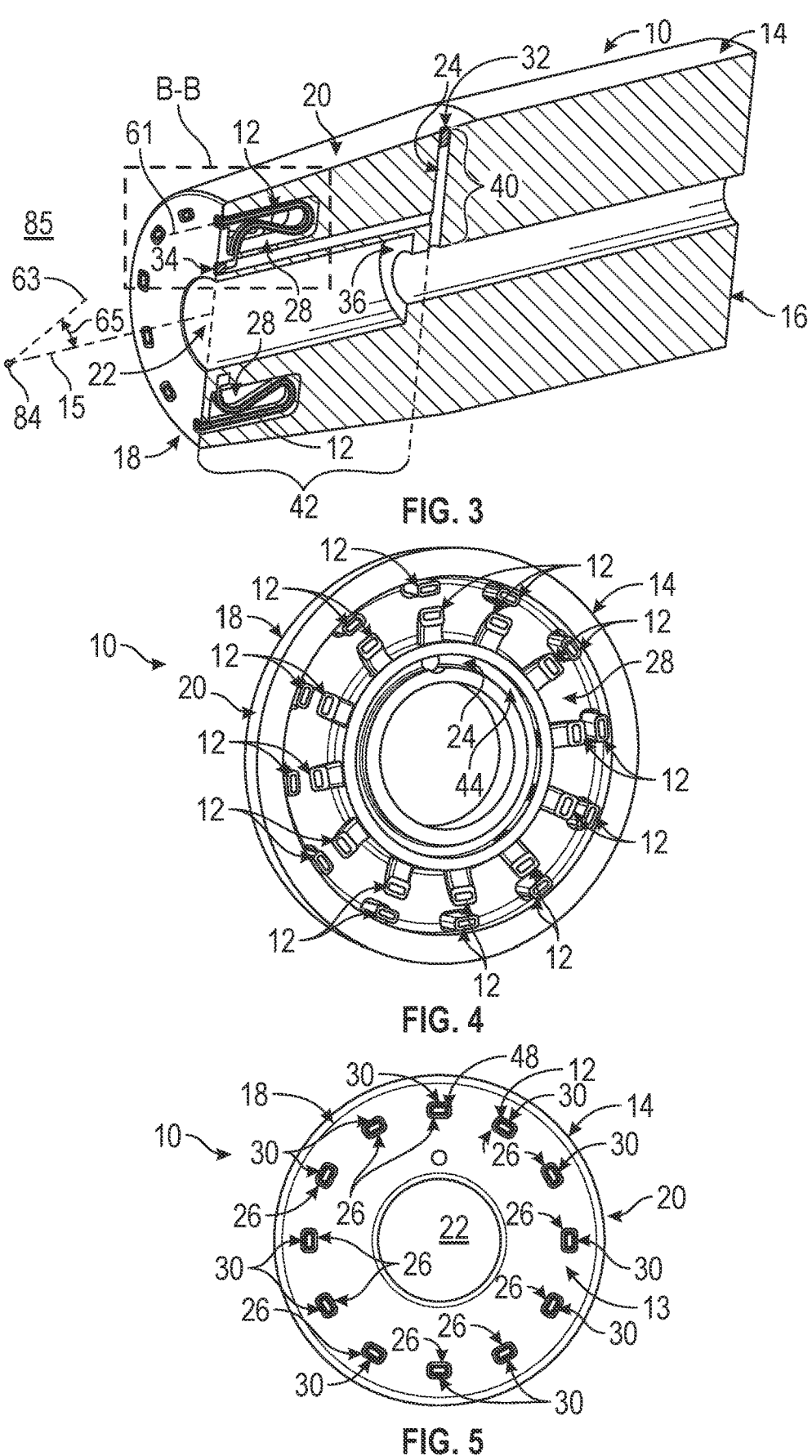
FIG. 3 is a sectional view of the toolholder shown in FIG. 1 taken along line 3-3.
FIG. 4 is a sectional view of the toolholder shown in FIG. 1 taken along line 4-4.
FIG. 5 is an end view of the toolholder shown in FIG. 1.
Figures 6, 7:
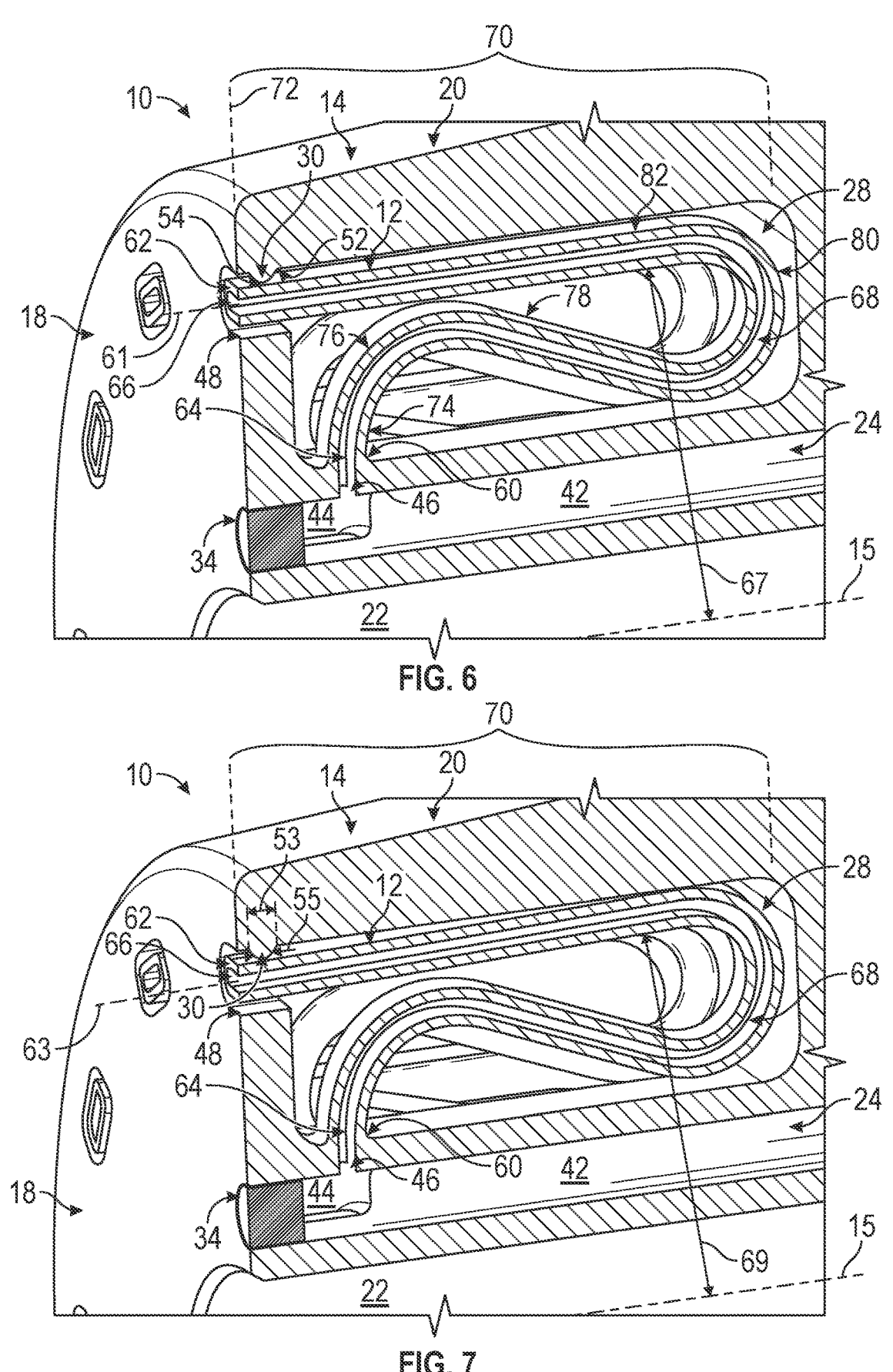
FIG. 6 is a magnified view of area B-B shown in FIG. 3 with the movable coolant pipes shown in a resting position.
FIG. 7 is a magnified view of area B-B shown in FIG. 3 with the movable coolant pipes shown in the deflected position.

The coolant channel 24 extends through a portion of the tool body 14. In the illustrated embodiment, the coolant channel 24 extends from the central passageway 22, toward the tool body second end 18, to the chamber 28, and to each coolant pipe of the plurality of coolant pipes 12. As shown in FIGS. 3 and 6, the coolant channel 24 has a first portion 40, a second portion 42, a third portion 44, and a plurality of connector portions 46. The first portion 40 extends from the central passageway 22 to the tool body sidewall 20. The second portion 42 extends from the first portion 40 to the tool body second end 18. The second portion 42 is in fluid communication with the first portion 40. The third portion 44 extends from the second portion 42 and around the entire central passageway 22. In the illustrated embodiment, the third portion 44 is an annular portion that extends to the connector portion 46. The third portion 44 is in fluid communication with the second portion 42 and the connector portion 46. Each connector portion of the plurality of connector portions 46 extends from the third portion 44 to the chamber 28 and to a respective coolant pipe of the plurality of coolant pipes 12.

Each passageway of the plurality of tool body passageways 26 extends from the tool body second end 18, toward the tool body first end 16, to the chamber 28. As shown in FIGS. 5, 6, and 7, a first passageway 48 of the plurality of passageways 26 extends from the tool body second end 18, toward the tool body first end 16, to the chamber 28. Each passageway of the plurality of tool body passageways 26 is sized and configured to receive a portion of a coolant pipe of the plurality of coolant pipes 12. In the illustrated embodiment, each passageway of the plurality of tool body passageways 26 has a rectangular cross-sectional shape. However, a tool body passageway can have any suitable cross-sectional shape and selection of a suitable cross-sectional shape can be based on various considerations, such as the cross-sectional shape of a coolant pipe intended to be disposed within a passageway.

While the tool body 14 has been illustrated as having a plurality of tool body passageways 26, a tool body can include any suitable number of tool body passageways. Selection of a suitable number of tool body passageways can be based on various considerations, including the number of coolant pipes included in a toolholder. Examples of numbers of tool body passageways considered suitable to include in a toolholder include one, at least one, two, a plurality, three, four, five, six, seven, eight, nine, ten, eleven, twelve, more than twelve, and any other number considered suitable for a particular embodiment. In the illustrated embodiment, the tool body 14 has twelve tool body passageways 26.

The chamber 28 extends from each passageway of the plurality of tool body passageways 26, toward the tool body first end 16, and toward the coolant channel 24. As shown in FIGS. 3, 4, 6, and 7, the chamber 28 extends from the first passageway 48 of the plurality of passageways 26 toward the tool body first end 16, and toward the coolant channel 24. In the illustrated embodiment, the chamber 28 extends around the entire central passageway 22 and to the coolant channel 24. The chamber 28 is in fluid communication with each connector portion of the plurality of connector portions 46 when the plurality of coolant pipes 26 are not present and is sized and configured to receive each coolant pipe of the plurality of coolant pipes 12.

While the chamber 28 has been illustrated as having a particular structural arrangement and as extending around the entire central passageway 22, a chamber can have any suitable structural arrangement and extend around any suitable portion of a central passageway. For example, alternative to including a chamber that extends around an entirety of a central passageway, a tool body can include one or more discrete chambers each of which houses a respective coolant pipe and is in fluid communication with one or more coolant channels (e.g., discrete connector portions).

Each projection of the plurality of projections 30 is disposed in a respective passageway of the plurality of tool body passageways 26. As shown in FIGS. 6 and 7, each projection of the plurality of projections 30 extends into its respective passageway of the plurality of tool body passageways 26 and has a first end 52, a second end 54, a first width 53 at the first end 52, and a second width 55 at the second end 54 that is less than the first width 53. Each projection of the plurality of projections 30 provides structure (e.g., pivot point) which a coolant pipe of the plurality of coolant pipes 12 contacts to direct movement of the coolant pipe during use. While each projection of the plurality of projections 30 has been illustrated as having a particular structural arrangement, a projection included in a toolholder can have any suitable structural arrangement and be positioned at any suitable location. For example, in alternative embodiments, a projection can have a cuboidal structural arrangement and/or be disposed on a coolant pipe and within a passageway defined by a tool body.

Each of the first cap 32 and the second cap 34 provides structure for sealing the coolant channel 24. The first cap 32 is disposed within the first portion 40 of the coolant channel 24 and the second cap 34 is disposed within the second portion 42 of the coolant channel 24. Each of the first and second caps 32, 34 can be attached to a tool body 14 using any suitable technique or method, such as using adhesives, welding, threaded connections, or any other technique or method considered suitable for a particular embodiment. Each of the first and second caps 32, 34 can be formed of any suitable material, such as the material that forms a tool body, or any other material considered suitable for a particular embodiment.

Each coolant pipe of the plurality of coolant pipes 12 is disposed within the chamber 28 and is disposed within a respective tool body passageway of the plurality of tool body passageways 26. In the illustrated embodiment, each coolant pipe of the plurality of coolant pipes 12 is partially disposed within the chamber 28 and partially disposed within a respective tool body passageway of the plurality of tool body passageways 26. As shown in FIGS. 6 and 7, each coolant pipe of the plurality of coolant pipes 12 has a coolant pipe first end 60, a coolant pipe second end 62, a coolant pipe first opening 64, a coolant pipe second opening 66, a coolant pipe passageway 68, and a coolant pipe portion 70. The coolant pipe first opening 64 is defined on the coolant pipe first end 60 and the coolant pipe second opening 66 is defined on the coolant pipe second end 62. The coolant pipe first end 60 is in fluid communication with the coolant channel 24 (e.g., the connector portion 46). The coolant pipe passageway 68 extends from the coolant pipe first opening 64 to the coolant pipe second opening 66. The coolant pipe portion 70 extends from the coolant pipe second end 62 toward the coolant pipe first end 60. Each coolant pipe of the plurality of coolant pipes 12 is disposed between a respective projection of the plurality of projections 30 and the central passageway 22. As shown in FIG. 6, the coolant pipe second end 62 and the coolant pipe second opening 66 are disposed on a hypothetical plane 72 that includes the tool body second end 18.

Each coolant pipe of the plurality of coolant pipes 12 is movable between a resting position, as shown in FIG. 6, and a deflected position, as shown in FIG. 7. In the resting position, each coolant pipe of the plurality of coolant pipes 12 (e.g., coolant pipe portion 70) is free of contact with a respective projection of the plurality of projections 30 and is disposed on a respective coolant pipe first axis 61. In the embodiment shown, the coolant pipe first axis 61 is substantially parallel to the central axis 15. In the resting position, the coolant pipe portion 70 of each coolant pipe of the plurality of coolant pipes 12 is free of contact with a respective projection of the plurality of projections 30. In the deflected position, each coolant pipe of the plurality of coolant pipes 12 (e.g., coolant pipe portion 70) contacts a respective projection of the plurality of projections 30 and is disposed on a respective coolant pipe second axis 63 that is different than the coolant pipe first axis 61. As shown in FIG. 3, the coolant pipe second axis 63 is disposed at an angle 65 relative to the central axis 15 and intersects the central axis 15 at a location 84 disposed in an environment 85 outside of the central passageway 22. In the deflected position, the coolant pipe portion 70 of each coolant pipe of the plurality of coolant pipes 12 contacts a respective projection of the plurality of projections 30. In the resting position the coolant pipe portion 70 is disposed a first distance 67 from the central axis 15 and in the deflected position the coolant pipe portion 70 is disposed a second distance 69 from the central axis 15 that is different than the first distance 67. In the illustrated embodiment, the second distance 69 is greater than the first distance 67.

A coolant pipe can have any suitable structural arrangement and selection of a suitable structural arrangement can be based on various considerations, including the intended use of a toolholder of which a coolant pipe is a component. For example, as shown in FIGS. 6 and 7, each coolant pipe of the plurality of coolant pipes 12 has a first straight portion 74, a first curved portion 76, a second straight portion 78, a second curved portion 80, and a third straight portion 82. The first straight portion 74 extends from the coolant pipe first end 60 to the first curved portion 76. The first curved portion 76 extends from the first straight portion 74 to the second straight portion 78. The second straight portion 78 extends from the first curved portion 76 to the second curved portion 80. The second curved portion 80 extends from the second straight portion 78 to the third straight portion 82. The third straight portion 82 extends from the second curved portion 80 to the coolant pipe second end 62. The coolant pipe portion 70 includes a portion of the third straight portion 82. In the embodiment shown, the coolant pipe first end 60, the coolant pipe second end 62, the first straight portion 74, the first curved portion 76, the second straight portion 78, the second curved portion 80, and the third straight portion 82 of each coolant pipe of the plurality of coolant pipes 12 are disposed on a respective hypothetical plane that contains the central axis 15. However, in alternative embodiments, a straight portion and/or curved portion can be disposed on any suitable hypothetical plane that can include a central axis, intersect a central axis, be free of contact with a central axis, or disposed at an angle relative to a central axis.

Each coolant pipe of the plurality of coolant pipes 12 is moveable between a resting position and a deflected position as a result of rotation of the toolholder 10 about the central axis 15. For example, when the toolholder 10 is in a resting position and is not rotating about the central axis 15, no centripetal force is applied to any coolant pipe of the plurality of coolant pipes 12. However, during use, and when the toolholder 10 is rotating about the central axis 15, centripetal force is applied to each coolant pipe of the plurality of coolant pipes 12 which elastically deforms and displaces each coolant pipe. Each coolant pipe of the plurality of coolant pipes 12 radially deforms outwardly and away from the central axis 15 as a result of the rotation of the toolholder 10 about the central axis 15 and such radial deformation and displacement will increase as the toolholder 10 rpm increases. Thus, toolholder 10 provides a mechanism for directing fluid traveling through each coolant pipe of the plurality of coolant pipes 12 toward a workpiece and/or the center of rotation and changing the direction of flow as the toolholder rpm is increased. The overall length, center of mass, thickness, and rigidity of a coolant pipe included in a toolholder can be adjusted to accomplish a particular angular deflection during use at a particular rpm. For example, a coolant pipe can have a variable thickness along its length to allow for a desired deflection during use (e.g., a thicker cross section in a curved portion (e.g., curved portion 76) to increase deflection during use).

While a plurality of coolant pipes having a particular structural arrangement has been illustrated, a toolholder can include any suitable number of coolant pipes having any suitable structural arrangement. Selection of a suitable number of coolant pipes and structural arrangement for a coolant pipe can be based on various considerations, including the intended use of a toolholder of which a coolant pipe is a component. Examples of numbers of coolant pipes considered suitable to include in a toolholder include one, at least one, two, a plurality, three, four, five, six, seven, eight, nine, ten, eleven, twelve, more than twelve, and any other number considered suitable for a particular embodiment. In the embodiment shown, the plurality of coolant pipes 12 includes twelve coolant pipes. Examples of structural arrangements considered suitable for a coolant pipe include those that have any suitable number of straight and/or curved portions and/or that have any suitable cross-sectional shape. For example, a coolant pipe of the plurality of coolant pipes 12 can omit the inclusion of a first straight portion such that a first curved portion is directly attached to the tool body 14. In the embodiment, shown each coolant pipe of the plurality of coolant pipes 12 has the same cross-sectional shape, which is rectangular. However, in alternative embodiments, a first portion of a plurality of coolant pipes can have a first cross-sectional shape and a second portion of the plurality of coolant pipes can have a second cross-sectional shape that is different than the first cross-sectional shape.

A tool body and each coolant pipe included in a toolholder can be formed of any suitable material and manufactured using any suitable method of technique. Selection of a suitable material and technique or method to manufacture a toolholder can be based on various considerations, including the intended use of a toolholder of which a tool body and a coolant pipe are a component. Examples of materials considered suitable to form a toolholder include metals, alloys, and any other material considered suitable for a particular embodiment. Examples of techniques and methods considered suitable to manufacture a toolholder include casting, 3-D printing, and any other technique or method considered suitable for a particular embodiment. In the illustrated embodiment, the tool body 14 and the plurality of coolant pipes 12 are formed from the same material and as a single, continuous piece of metal material using 3-D printing.

The features of the toolholders described herein (e.g., tool body, coolant pipe) can be incorporated into any suitable toolholder and selection of a suitable toolholder to include the features described herein can be based on various considerations, including the type of workpiece being shaped. Examples of toolholders considered suitable to include the features described herein include shrink fit toolholders, hydraulic chucks, milling chucks, add-on rings, and any other toolholder considered suitable for a particular embodiment.

FIGS. 8A, 8B, 9A, and 9B illustrate a second example toolholder 110 that has a coolant pipe 112. The toolholder 110 is similar to the toolholder 10 illustrated in FIGS. 1 through 7 and described above, except as detailed below. The toolholder 110 has a tool body 114 and the coolant pipe 112.

Figure 8A:
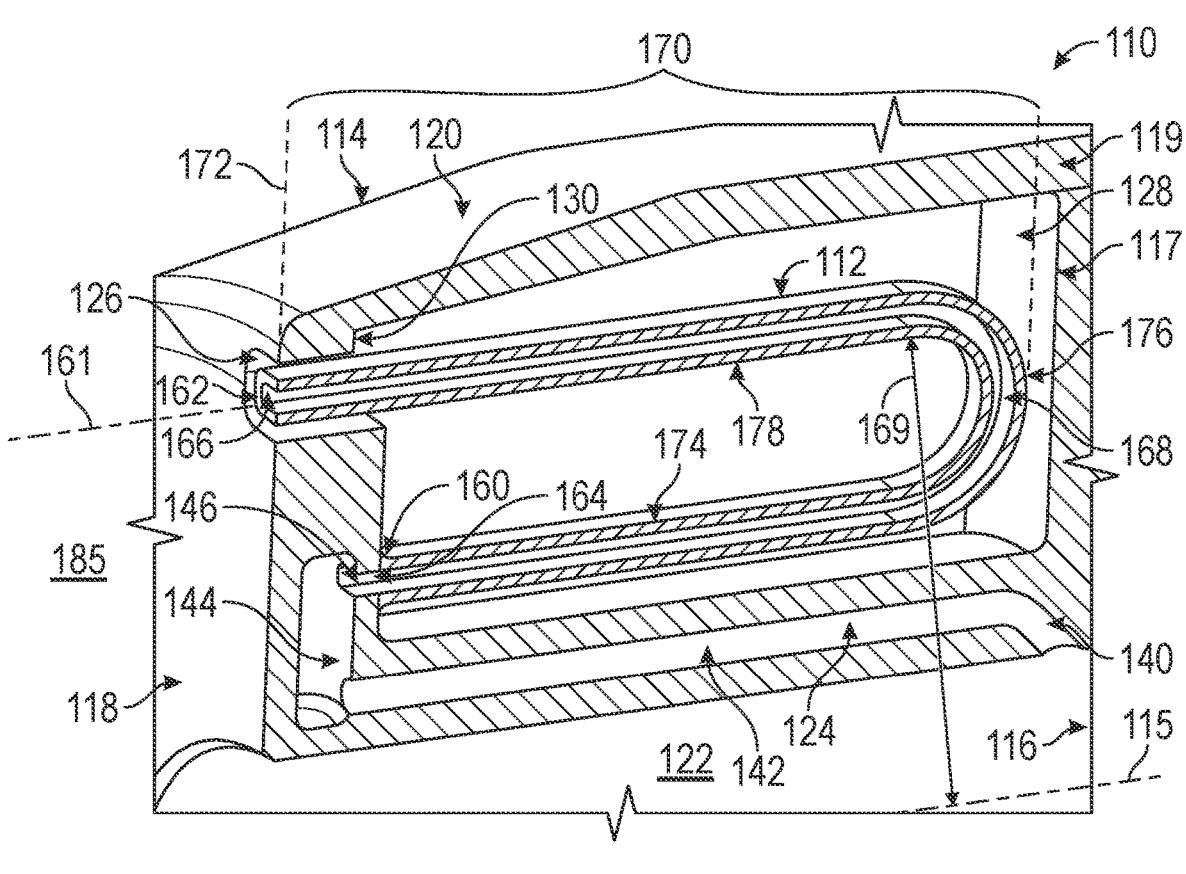
FIG. 8A is a perspective sectional view of a second example toolholder that has a movable coolant pipe. The movable coolant pipe is shown in a resting position.
Figure 9A:
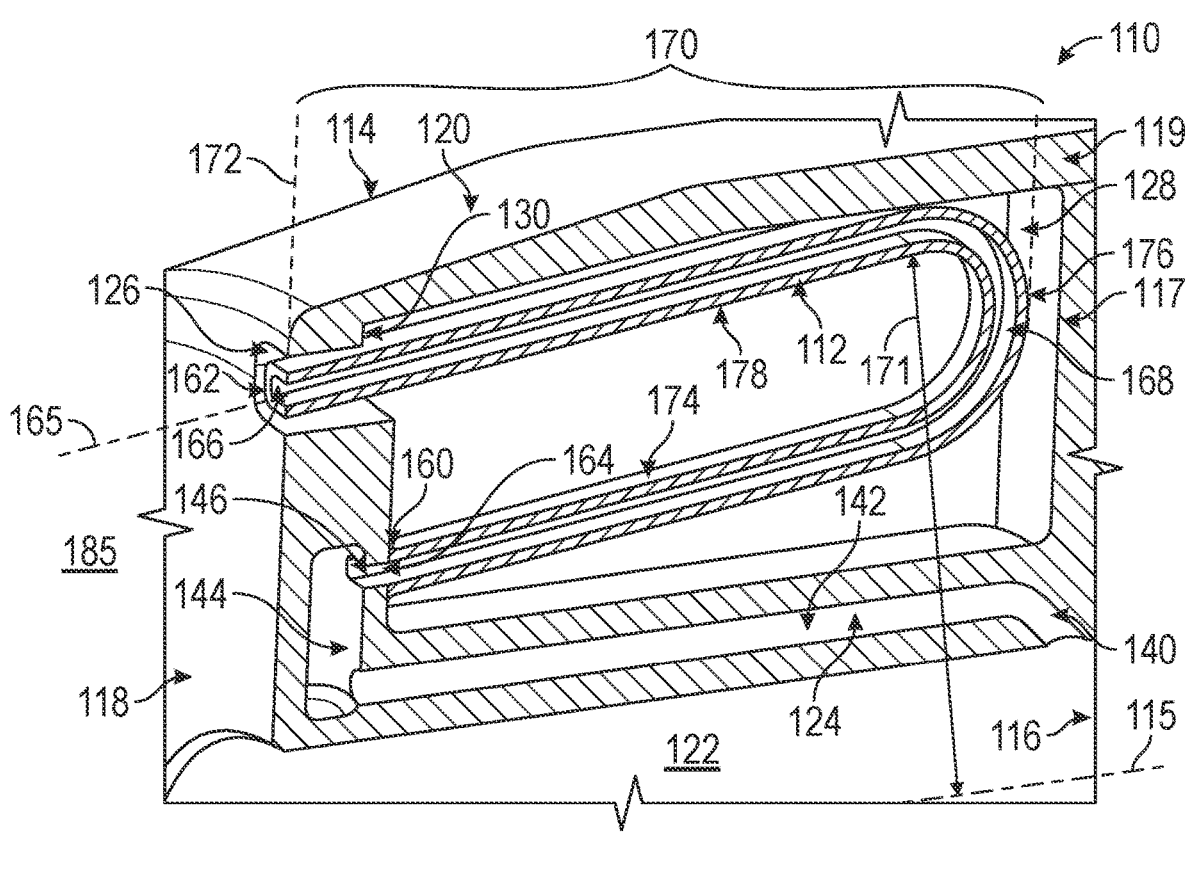
FIG. 9A is another perspective sectional view of the toolholder shown in FIG. 8A. The movable coolant pipe is shown in a deflected position.

In the illustrated embodiment, the tool body 114 and the coolant pipe 112 are formed from different materials and as separate pieces of material attached to one another. To accomplish assembly of this embodiment, as shown in FIGS. 8A and 9A, the tool body 114 has a first portion 117 attached to a second portion 119. In addition, the tool body 114 has a shoulder 130 disposed within the chamber 128.

The coolant channel 124 extends through a portion of the tool body 114. In the illustrated embodiment, the coolant channel 124 extends from the central passageway 122, toward the tool body second end 118, toward the chamber 128, and to the coolant pipe 112. The coolant channel 124 has a first portion 140, a second portion 142, a third portion 144, and a connector portion 146. The first portion 140 extends from the central passageway 122 toward the tool body sidewall 120 and to the second portion 142. The second portion 142 extends from the first portion 140 toward the tool body second end 118 and to the third portion 144. The second portion 142 is in fluid communication with the first portion 140 and the third portion 144. The third portion 144 extends from the second portion 142 and around the entire central passageway 122. The third portion 144 is in fluid communication with the second portion 142 and the connector portion 146. The connector portion 146 extends from the third portion 144 to the chamber 128. The connector portion 146 is in fluid communication with the third portion 144 and the chamber 128 when the coolant pipe 112 is not present.

The tool body passageway 126 extends from the tool body second end 118, toward the tool body first end 116, to the chamber 128. The tool body passageway 126 is sized and configured to receive a portion of the coolant pipe 112. In the illustrated embodiment, the tool body 114 has one tool body passageway 126. The chamber 128 extends from the tool body passageway 126, toward the tool body first end 116, toward the central axis 115, and toward the coolant channel 124. The chamber 128 is sized and configured to receive the coolant pipe 112. The shoulder 130 is disposed in the chamber 128 and provides structure (e.g., pivot point) which the coolant pipe 112 contacts to direct movement of the coolant pipe during use.

The coolant pipe 112 is disposed within the chamber 128 and within the tool body passageway 126. In the illustrated embodiment, the toolholder 110 includes one coolant pipe 112, which is partially disposed within the chamber 128 and partially disposed within the tool body passageway 126. The coolant pipe 112 has a coolant pipe first end 160 attached to the tool body 114, a coolant pipe second end 162, a coolant pipe first opening 164, a coolant pipe second opening 166, a coolant pipe passageway 168, and a coolant pipe portion 170. The coolant pipe portion 170 extends from the coolant pipe second end 162 toward the coolant pipe first end 160. The coolant pipe first opening 164 is in fluid communication with the coolant channel 124. In the embodiment shown, the coolant pipe first opening 164 is in fluid communication with the connector portion 146. The coolant pipe 112 is disposed between the shoulder 130 and the central passageway 122. In the embodiment shown, the coolant pipe second end 162 and the coolant pipe second opening 166 are disposed on a hypothetical plane 172 that is disposed between the tool body second end 118 and the tool body first end 116. As a result, the coolant pipe second end 162 and the coolant pipe second opening 166 are each disposed between the tool body first end 116 and the tool body second end 118.

Figure 8B:
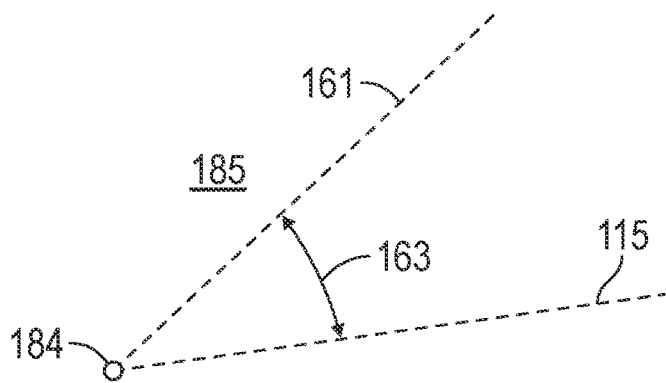
FIG. 8B illustrates the relative angle between a first axis on which the coolant pipe is disposed and the central axis of the tool body.
Figure 9B:
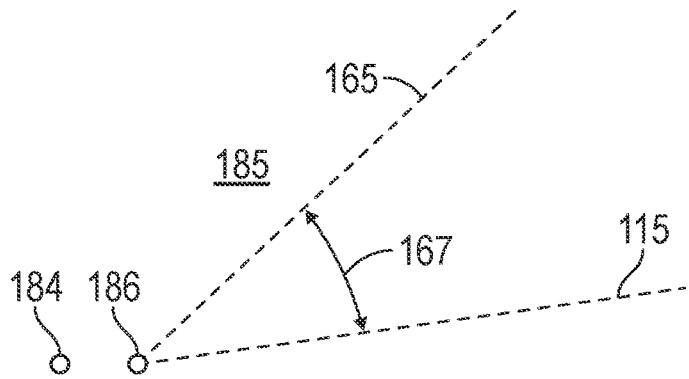
FIG. 9B illustrates the relative angle between a second axis on which the coolant pipe is disposed and the central axis of the tool body.

The coolant pipe 112 is movable between a resting position, as shown in FIG. 8A, and a deflected position, as shown in FIG. 9A. In the resting position, the coolant pipe 112 (e.g., coolant pipe portion 170) is free of contact with the shoulder 130 and is disposed on a coolant pipe first axis 161. As shown in FIG. 8B, the coolant pipe first axis 161 is disposed at a first angle 163 relative to the central axis 115 and intersects the central axis 115 at a first location 184 disposed in an environment 185 outside of the central passageway 122. In the resting position, the coolant pipe portion 170 is free of contact with the shoulder 130. In the deflected position, the coolant pipe 112 (e.g., coolant pipe portion 170) contacts the shoulder 130 and is disposed on a coolant pipe second axis 165 that is different than the coolant pipe first axis 161. As shown in FIG. 9B, the coolant pipe second axis 165 is disposed at a second angle 167 relative to the central axis 115 that is greater than the first angle 163 and intersects the central axis 115 at a second location 186. The second location 186 is disposed in an environment 185 outside of the central passageway 122 and is positioned between the first location 184 and the tool body second end 118. In the deflected position, the coolant pipe portion 170 contacts the shoulder 130. In the resting position the coolant pipe portion 170 is disposed a first distance 169 from the central axis 115 and in the deflected position the coolant pipe portion 170 is disposed a second distance 171 from the central axis 115 that is different than the first distance 169. In the illustrated embodiment, the second distance 171 is greater than the first distance 169.

As shown in FIGS. 8A and 9A, the coolant pipe 112 has a first straight portion 174, a first curved portion 176, and a second straight portion 178. The first straight portion 174 extends from the coolant pipe first end 160 to the first curved portion 176. The first curved portion 176 extends from the first straight portion 174 to the second straight portion 178. The second straight portion 178 extends from the first curved portion 176 to the coolant pipe second end 162. The coolant pipe portion 170 includes the second straight portion 178. In the embodiment shown, the coolant pipe first end 160, the coolant pipe second end 162, the first straight portion 174, the first curved portion 176, and the second straight portion 178 are disposed on a hypothetical plane that contains the central axis 115.

The coolant pipe 112 is moveable between a resting position and a deflected position as a result of rotation of the toolholder 110 about the central axis 115. For example, when the toolholder 110 is in a resting position and is not rotating about the central axis 115, no centripetal force is applied to the coolant pipe 112. However, during use, and when the toolholder 110 is rotating about the central axis 115, centripetal force is applied to the coolant pipe 112, which elastically deforms and displaces. The coolant pipe 112 radially deforms outwardly and away from the central axis 115 as a result of the rotation of the toolholder 110 about the central axis 115 and such radial deformation and displacement will increase as the toolholder 110 rpm increases. Thus, toolholder 110 provides a mechanism for directing fluid traveling through the coolant pipe 112 toward a workpiece and/or the center of rotation and changing the direction of flow as the toolholder 110 rpm is increased.

FIGS. 10, 11, 12, 13, 14A, and 14B illustrate a third example toolholder 210 that has a plurality of coolant pipes 212. The toolholder 210 is similar to the toolholder 10 illustrated in FIGS. 1 through 7 and described above, except as detailed below. The toolholder 210 has a tool body 214 and the plurality of coolant pipes 212.

The tool body 214 is rotatable around a central axis 215 and has a tool body first end 216, a tool body second end 218, a tool body sidewall 220, a central passageway 222, a plurality of coolant channels 224, a plurality of tool body passageways 226, a chamber 228, and a plurality of projections 230.

Each coolant channel of the plurality of coolant channels 224 extends through a portion of the tool body 214. In the illustrated embodiment, each coolant channel of the plurality of coolant channels 224 extends from the central passageway 222, toward the tool body second end 218, and to each coolant pipe of the plurality of coolant pipes 212. Each coolant channel of the plurality of coolant channels 224 has a first portion 240, a second portion 242, and a third portion 244. The first portion 240 extends from the central passageway 222 toward the tool body sidewall 220 to the second portion 242. The second portion 242 extends from the first portion 240 toward the tool body second end 218 to the third portion 244. The second portion 242 is in fluid communication with the first portion 240 and the third portion 244. The third portion 244 extends from the second portion 242 and around the entire central passageway 222 and to each coolant pipe passageway 268. The third portion 244 is in fluid communication with the second portion 242 of each coolant channel of the plurality of coolant channels 224 and is an annular portion that extends to each coolant pipe passageway 268.

Figure 10:
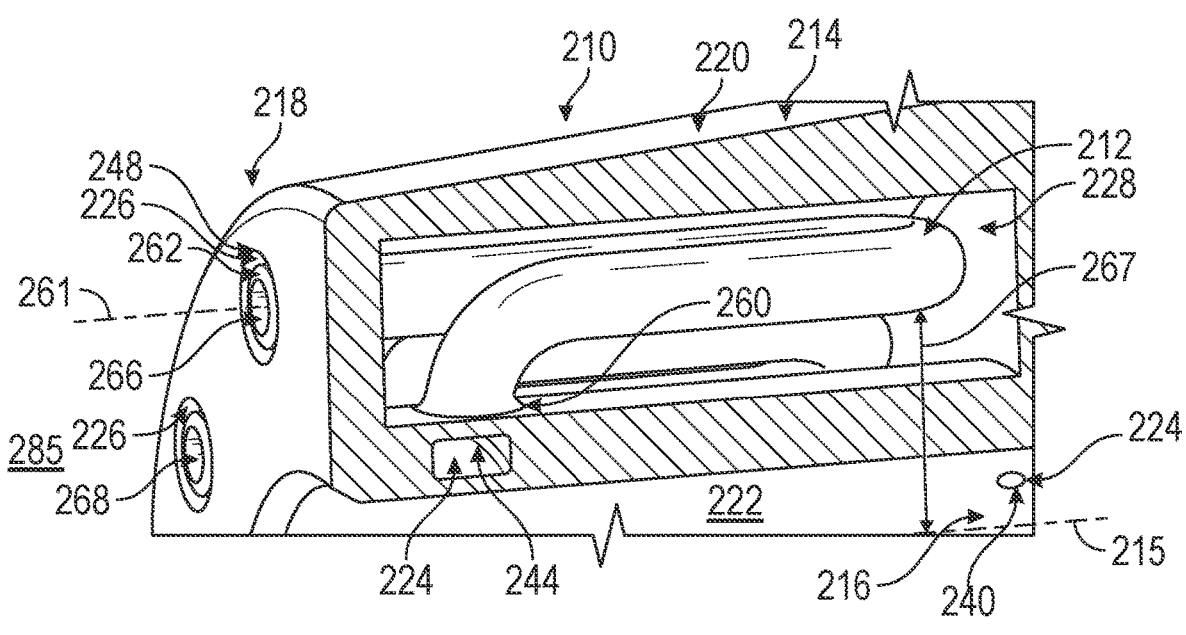
FIG. 10 is a perspective sectional view of a third example toolholder that has a plurality of movable coolant pipes. The movable coolant pipes are shown in a resting position.
Figure 11:
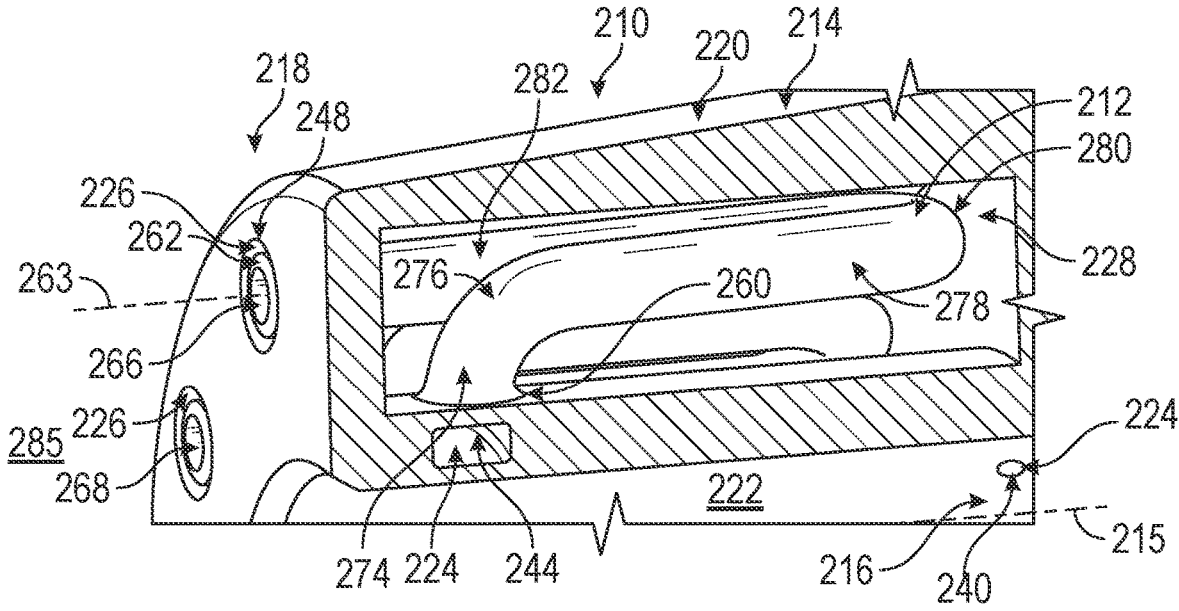
FIG. 11 is another perspective sectional view of the toolholder shown in FIG. 10. The movable coolant pipes are shown in a deflected position.
Figure 14A:
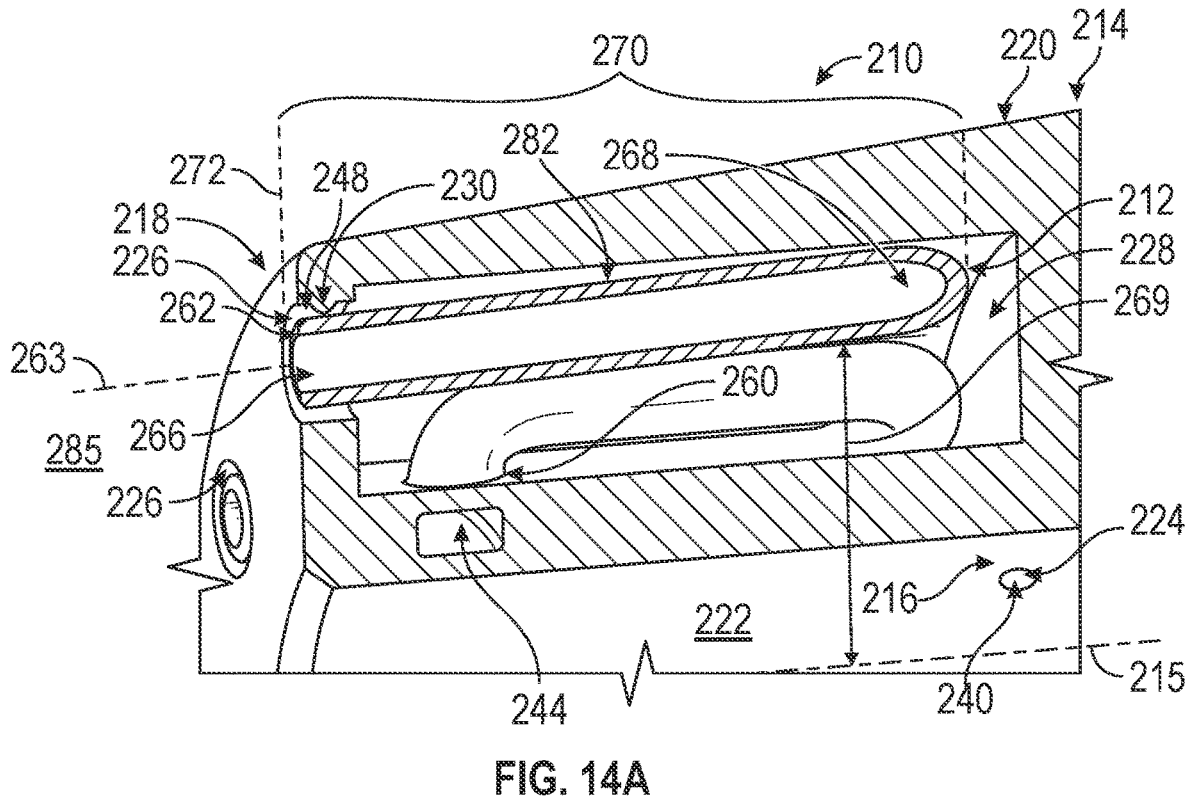
FIG. 14A is another perspective sectional view of the toolholder shown in FIG. 10. The movable coolant pipes are shown in a deflected position.

Each passageway of the plurality of tool body passageways 226 extends from the tool body second end 218, toward the tool body first end 216, to the chamber 228. As shown in FIGS. 10, 11, and 14A, a first passageway 248 of the plurality of passageways 226 extends from the tool body second end 218, toward the tool body first end 216, to the chamber 228. Each passageway of the plurality of tool body passageways 226 is sized and configured to receive a portion of a coolant pipe of the plurality of coolant pipes 214. In the illustrated embodiment, each passageway of the plurality of tool body passageways 226 has a circular cross-sectional shape.

The chamber 228 extends from each passageway of the plurality of tool body passageways 226, toward the tool body first end 216, and toward the third portion 244 of the plurality of coolant channels 224. As shown in FIGS. 10, 11, and 14A, the chamber 228 extends from the first passageway 248 of the plurality of passageways 226 toward the tool body first end 216, and toward the plurality of coolant channels 224. In the illustrated embodiment, the chamber 228 extends around the entire central passageway 222 and toward the third portion 244 of the plurality of coolant channels 224. The chamber 228 is sized and configured to receive each coolant pipe of the plurality of coolant pipes 212.

Each coolant pipe of the plurality of coolant pipes 212 is disposed within the chamber 228 and is disposed within a respective tool body passageway of the plurality of tool body passageways 226. In the illustrated embodiment, each coolant pipe of the plurality of coolant pipes 212 is partially disposed within the chamber 228 and partially disposed within a respective tool body passageway of the plurality of tool body passageways 226. Each coolant pipe of the plurality of coolant pipes 212 has a coolant pipe first end 260, a coolant pipe second end 262, a coolant pipe first opening 264, a coolant pipe second opening 266, a coolant pipe passageway 268, and a coolant pipe portion 270. The coolant pipe portion 270 extends from the coolant pipe second end 262 toward the coolant pipe first end 260. The coolant pipe first opening 264 is in fluid communication with the third portion 244 of the plurality of coolant channels 224. Each coolant pipe of the plurality of coolant pipes 212 is disposed between a respective projection of the plurality of projections 230 and the central passageway 222. In the embodiment shown, the coolant pipe second end 262 and the coolant pipe second opening 266 are disposed on a hypothetical plane 272 that is disposed in an environment 285 outside of the central passageway 222.

Figure 12:
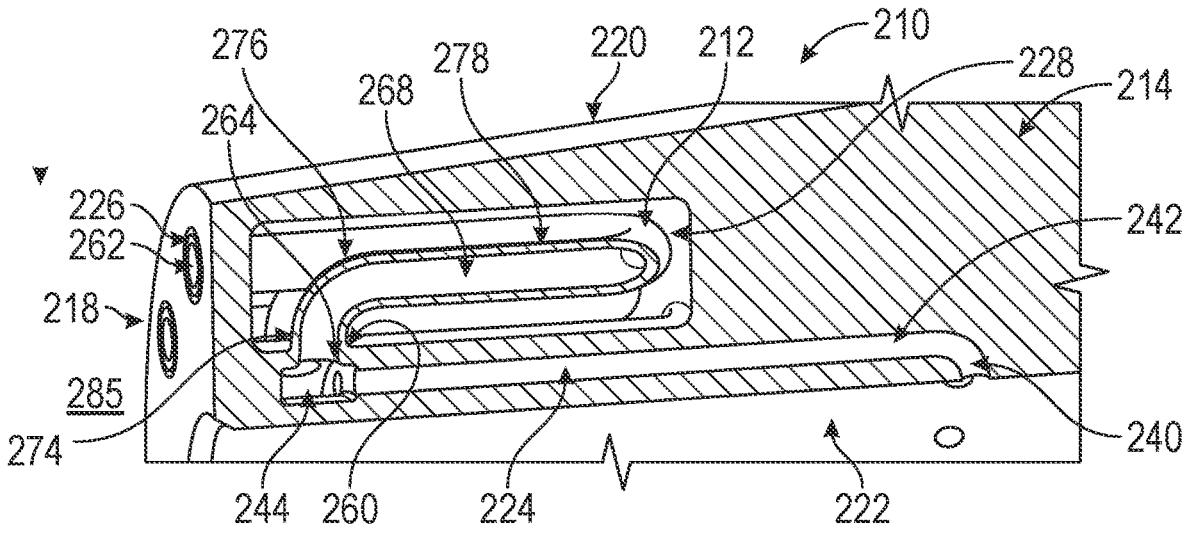
FIG. 12 is another perspective sectional view of the toolholder shown in FIG. 10. The movable coolant pipes are shown in a resting position.
Figure 13:
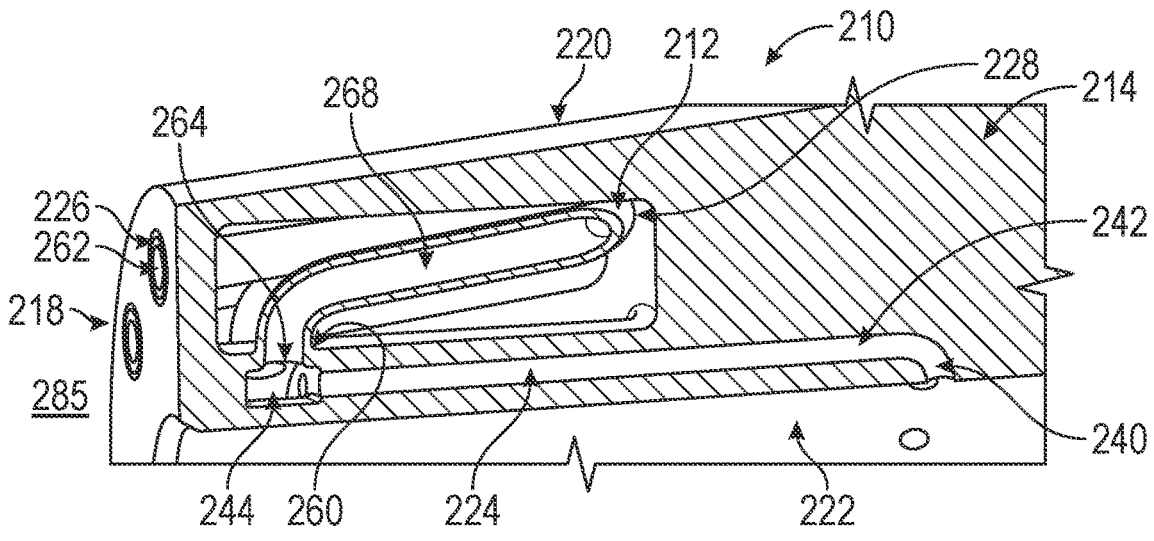
FIG. 13 is another perspective sectional view of the toolholder shown in FIG. 10. The movable coolant pipes are shown in a deflected position.
Figure 14B:
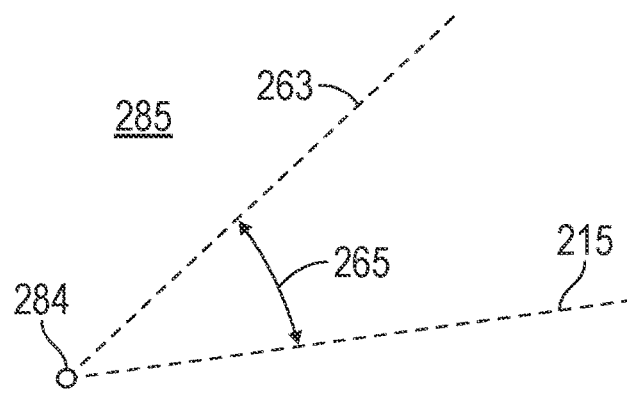
FIG. 14B illustrates the relative angle between a second axis on which the coolant pipe is disposed and the central axis of the tool body.

Each coolant pipe of the plurality of coolant pipes 212 is movable between a resting position, as shown in FIGS. 10 and 12, and a deflected position, as shown in FIGS. 11, 13, and 14A. In the resting position, each coolant pipe of the plurality of coolant pipes 212 (e.g., coolant pipe portion 270) contacts a respective projection of the plurality of projections 230 and is disposed on a respective coolant pipe first axis 261. In the embodiment shown, the coolant pipe first axis 261 is substantially parallel to the central axis 215. In the resting position, the coolant pipe portion 270 of each coolant pipe of the plurality of coolant pipes 212 contacts a respective projection of the plurality of projections 230. In the deflected position, each coolant pipe of the plurality of coolant pipes 212 (e.g., coolant pipe portion 270) contacts a respective projection of the plurality of projections 230 and is disposed on a respective coolant pipe second axis 263 that is different than the coolant pipe first axis 261. As shown in FIG. 14B, the coolant pipe second axis 263 is disposed at an angle 265 relative to the central axis 215 and intersects the central axis 215 at a location 284 disposed in an environment 285 outside of the central passageway 222. In the deflected position, the coolant pipe portion 270 of each coolant pipe of the plurality of coolant pipes 212 contacts a respective projection of the plurality of projections 230. In the resting position the coolant pipe portion 270 is disposed a first distance 267 from the central axis 215 and in the deflected position the coolant pipe portion 270 is disposed a second distance 269 from the central axis 215 that is different than the first distance 267. The second distance 269 is greater than the first distance 267.

As shown in FIGS. 10, 11, 12, 13, and 14A, each coolant pipe of the plurality of coolant pipes 212 has a circular cross-sectional shape, a first straight portion 274, a first curved portion 276, a second straight portion 278, a second curved portion 280, and a third straight portion 282. The first straight portion 274 extends from the coolant pipe first end 260 to the first curved portion 276. The first curved portion 276 extends from the first straight portion 274 to the second straight portion 278. The second straight portion 278 extends from the first curved portion 276 to the second curved portion 280. The second curved portion 280 extends from the second straight portion 278 to the third straight portion 282. The third straight portion 282 extends from the second curved portion 280 to the coolant pipe second end 262. The coolant pipe portion 270 includes a portion of the third straight portion 282. As shown in FIG. 12, the coolant pipe first end 260, the first straight portion 274, the first curved portion 276, and the second straight portion 278 are disposed on a first hypothetical plane that contains the central axis 215. As shown in FIG. 14A, the coolant pipe second end 262 and the third straight portion 282 are disposed on a second hypothetical plane that contains the central axis 215 and is different than the first hypothetical plane 283.

Each coolant pipe of the plurality of coolant pipes 212 is moveable between a resting position and a deflected position as a result of rotation of the toolholder 210 about the central axis 215. For example, when the toolholder 210 is in a resting position and is not rotating about the central axis 215, no centripetal force is applied to any coolant pipe of the plurality of coolant pipes 212. However, during use, and when the toolholder 210 is rotating about the central axis 215, centripetal force is applied to each coolant pipe of the plurality of coolant pipes 212 which elastically deforms and displaces each coolant pipe. Each coolant pipe of the plurality of coolant pipes 212 radially deforms outwardly and away from the central axis 215 as a result of the rotation of the toolholder 210 about the central axis 215 and such radial deformation and displacement will increase as the toolholder 210 rpm increases. Thus, toolholder 210 provides a mechanism for directing fluid traveling through each coolant pipe of the plurality of coolant pipes 212 toward a workpiece and/or the center of rotation and changing the direction of flow as the toolholder rpm is increased.

Figure 15:
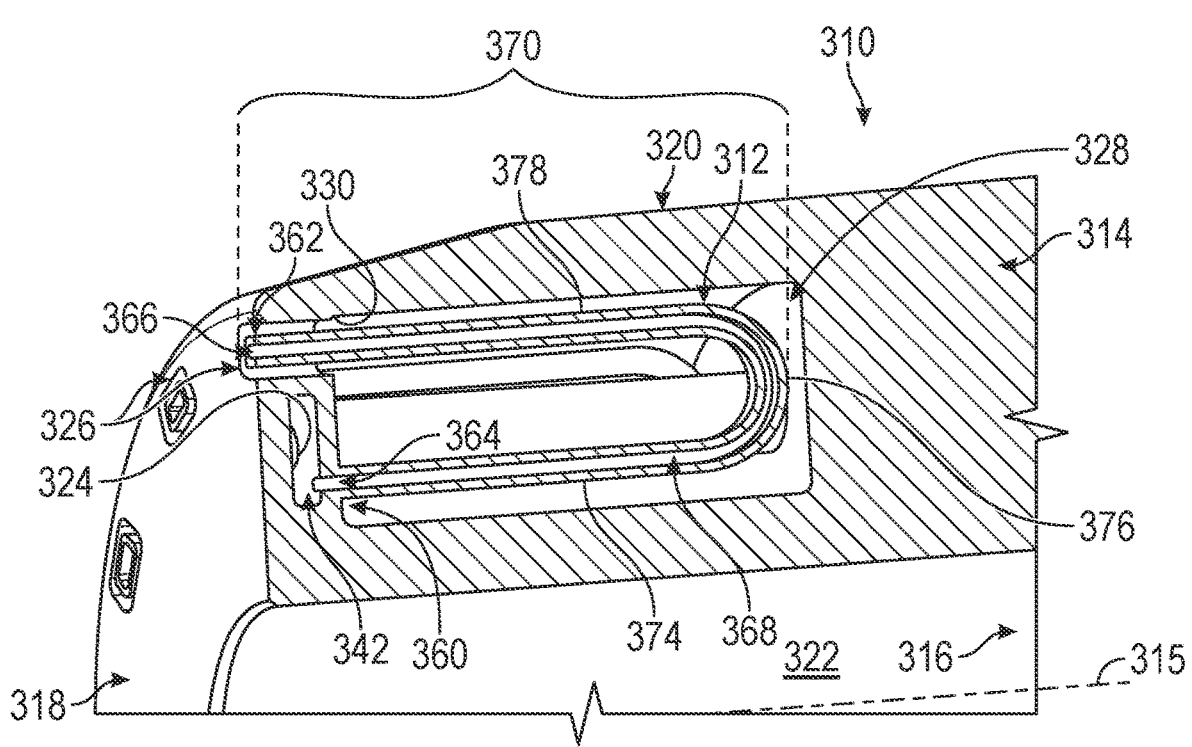
FIG. 15 is a perspective sectional view of a fourth example toolholder that has a plurality of movable coolant pipes. The movable coolant pipes are shown in a resting position.
Figure 16:
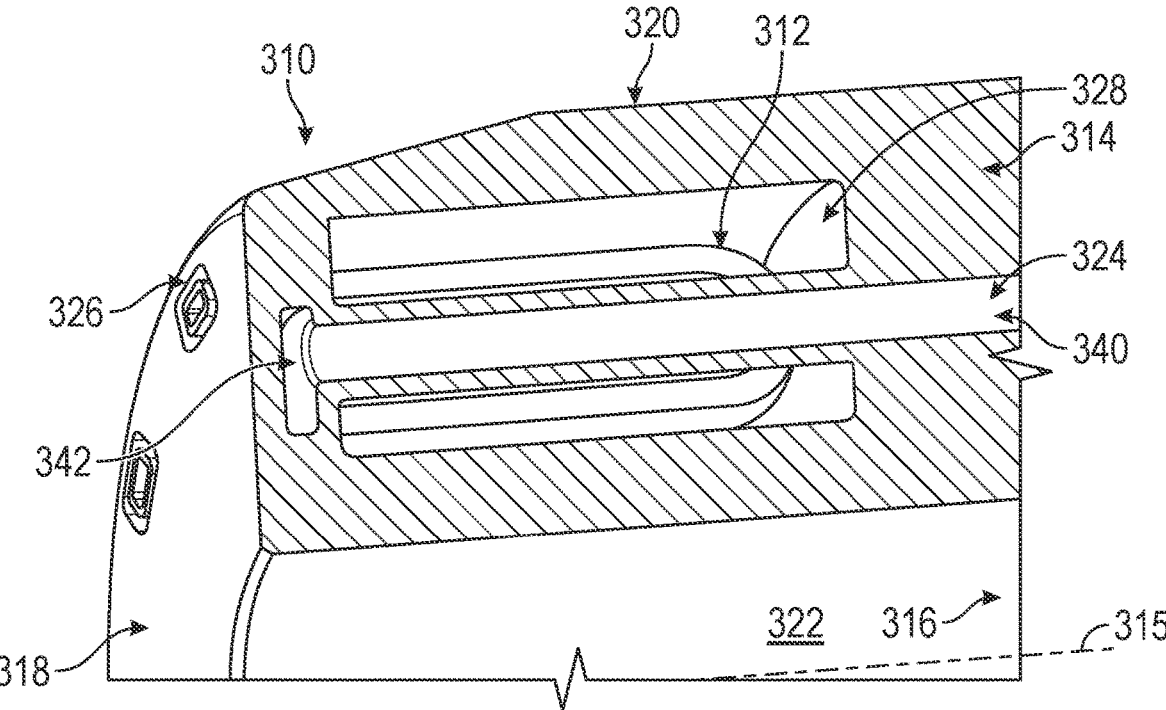
FIG. 16 is another perspective sectional view of the toolholder shown in FIG. 15.

FIGS. 15 and 16 illustrate a fourth example toolholder 310 that has a plurality of coolant pipes 312. The toolholder 310 is similar to the toolholder 10 illustrated in FIGS. 1 through 7 and described above, except as detailed below. The toolholder 310 has a tool body 314 and the plurality of coolant pipes 312.

The tool body 314 is rotatable around a central axis 315 and has a tool body first end 316, a tool body second end 318, a tool body sidewall 320, a central passageway 322, a coolant channel 324, a plurality of tool body passageways 326, a chamber 328, and a shoulder 330.

The coolant channel 324 extends through a portion of the tool body 314. In the illustrated embodiment, the coolant channel 324 extends from the tool body first end 316, toward the tool body second end 318, and to each coolant pipe of the plurality of coolant pipes 312. As shown in FIG. 16, the coolant channel 324 has a first portion 340 and a second portion 342. The first portion 340 extends from the tool body first end 316, toward the tool body second end 318, and to the second portion 342. The second portion 342 extends from the first portion 340 and around the entire central passageway 322 and to each coolant pipe passageway 368. The second portion 342 is in fluid communication with the first portion 340 and is an annular portion that extends to each coolant pipe passageway 368.

The chamber 328 extends from each passageway of the plurality of tool body passageways 326, toward the tool body first end 316, and toward the central passageway 322. In the illustrated embodiment, the chamber 328 extends around the entire central passageway 322 and toward the coolant channel 324. The chamber 328 is sized and configured to receive each coolant pipe of the plurality of coolant pipes 312.

Each coolant pipe of the plurality of coolant pipes 312 is disposed within the chamber 328 and is disposed within a respective tool body passageway of the plurality of tool body passageways 326. In the illustrated embodiment, each coolant pipe of the plurality of coolant pipes 312 is partially disposed within the chamber 328 and partially disposed within a respective tool body passageway of the plurality of tool body passageways 326. Each coolant pipe of the plurality of coolant pipes 312 has a coolant pipe first end 360, a coolant pipe second end 362, a coolant pipe first opening 364, a coolant pipe second opening 366, a coolant pipe passageway 368, and a coolant pipe portion 370. The coolant pipe portion 370 extends from the coolant pipe second end 362 toward the coolant pipe first end 360. The coolant pipe first opening 364 is in fluid communication with the coolant channel 324. The coolant pipe first opening 364 is in fluid communication with a second portion 342 of the coolant channel 324. Each coolant pipe of the plurality of coolant pipes 312 is disposed between the shoulder 330 and the central passageway 322.

Each coolant pipe of the plurality of coolant pipes 312 is movable between a resting position, as shown in FIG. 15, and a deflected position. As shown in FIGS. 15 and 16, each coolant pipe of the plurality of coolant pipes 312 has a first straight portion 374, a first curved portion 376, and a second straight portion 378. The first straight portion 374 extends from the coolant pipe first end 360 to the first curved portion 376. The first curved portion 376 extends from the first straight portion 374 to the second straight portion 378. The second straight portion 378 extends from the first curved portion 376 to the coolant pipe second end 362. The coolant pipe portion 370 includes a portion of the second straight portion 378. In the embodiment shown, the coolant pipe first end 360, the first straight portion 374, the first curved portion 376, and the second straight portion 378 are disposed on a first hypothetical plane that contains the central axis 315.

Each coolant pipe of the plurality of coolant pipes 312 is moveable between a resting position and a deflected position as a result of rotation of the toolholder 310 about the central axis 315. For example, when the toolholder 310 is in a resting position and is not rotating about the central axis 315, no centripetal force is applied to any coolant pipe of the plurality of coolant pipes 312. However, during use, and when the toolholder 310 is rotating about the central axis 315, centripetal force is applied to each coolant pipe of the plurality of coolant pipes 312 which elastically deforms and displaces each coolant pipe. Each coolant pipe of the plurality of coolant pipes 312 radially deforms outwardly and away from the central axis 315 as a result of the rotation of the toolholder 310 about the central axis 315 and such radial deformation and displacement will increase as the toolholder 310 rpm increases. Thus, toolholder 310 provides a mechanism for directing fluid traveling through each coolant pipe of the plurality of coolant pipes 312 toward a workpiece and/or the center of rotation and changing the direction of flow as the toolholder rpm is increased.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A toolholder comprising:
   a tool body rotatable around a central axis, the tool body having a tool body first end, a tool body second end, a coolant channel, a tool body passageway, and a chamber, the coolant channel extending through a portion of the tool body, the tool body passageway disposed on the tool body second end, the chamber extending from the tool body passageway toward the coolant channel; and a coolant pipe attached to the tool body, the coolant pipe disposed within the chamber and partially disposed within the tool body passageway, the coolant pipe having a coolant pipe first end, a coolant pipe second end, a coolant pipe first opening, a coolant pipe second opening, a coolant pipe passageway, and a coolant pipe portion, the coolant pipe first opening in fluid communication with the coolant channel, the coolant pipe passageway extending from the coolant pipe first opening to the coolant pipe second opening, the coolant pipe portion extending from the coolant pipe second end toward the coolant pipe first end, the coolant pipe movable between a resting position and a deflected position, in the resting position the coolant pipe portion disposed a first distance from the central axis, in the deflected position the coolant pipe portion disposed a second distance from the central axis that is different than the first distance.

2. The toolholder of claim 1, wherein in the resting position the coolant pipe portion is disposed on a coolant pipe first axis; and wherein in the deflected position the coolant pipe portion is disposed on a coolant pipe second axis that is different than the coolant pipe first axis.

3. The toolholder of claim 2, wherein the coolant pipe first axis is substantially parallel to the central axis.

4. The toolholder of claim 2, wherein the coolant pipe first axis is disposed at a first angle relative to the central axis; and wherein the coolant pipe second axis is disposed at a second angle relative to the central axis that is different than the first angle.

5. The toolholder of claim 4, wherein the second angle is greater than the first angle.

6. The toolholder of claim 1, wherein the second distance is greater than the first distance.

7. The toolholder of claim 1, wherein the coolant pipe second opening is disposed between the tool body first end and the tool body second end.

8. The toolholder of claim 1, wherein the coolant pipe portion contacts the tool body in the deflected position.

9. The toolholder of claim 1, wherein the coolant pipe first end is attached to the tool body.

10. The toolholder of claim 1, wherein the tool body has a projection extending into the tool body passageway.

11. The toolholder of claim 10, wherein the tool body has a central passageway extending from the tool body first end to the tool body second end; and wherein the coolant pipe is disposed between the projection and the central passageway.

12. The toolholder of claim 10, wherein the coolant pipe contacts the projection in the deflected position.

13. The toolholder of claim 1, wherein the tool body has a central passageway extending from the tool body first end to the tool body second end; and wherein the coolant channel extends from the central passageway toward the chamber.

14. The toolholder of claim 1, wherein the tool body has a central passageway extending from the tool body first end to the tool body second end; and wherein the coolant channel has an annular portion extending around the entire central passageway.

15. The toolholder of claim 1, wherein the tool body defines a shoulder within the chamber.

16. The toolholder of claim 15, wherein the coolant pipe contacts the shoulder in the deflected position.

17. The toolholder of claim 1, wherein the coolant pipe is partially disposed within the chamber.

18. The toolholder of claim 1, wherein the coolant pipe has a first straight portion, a first curved portion, a second straight portion, a second curved portion, and a third straight portion, the first straight portion extending from the coolant pipe first end to the first curved portion, the first curved portion extending from the first straight portion to the second straight portion, the second straight portion extending from the first curved portion to the second curved portion, the second curved portion extending from the second straight portion to the third straight portion, the third straight portion extending from the second curved portion to the coolant pipe second end.

19. A toolholder comprising:

a tool body rotatable around a central axis, the tool body having a tool body first end, a tool body second end, a coolant channel, a tool body passageway, and a chamber, the coolant channel extending through a portion of the tool body, the tool body passageway disposed on the tool body second end, the chamber extending from the tool body passageway toward the coolant channel; and a coolant pipe attached to the tool body, the coolant pipe disposed within the chamber and partially disposed within the tool body passageway, the coolant pipe having a coolant pipe first end, a coolant pipe second end, a coolant pipe first opening, a coolant pipe second opening, a coolant pipe passageway, and a coolant pipe portion, the coolant pipe first opening in fluid communication with the coolant channel, the coolant pipe passageway extending from the coolant pipe first opening to the coolant pipe second opening, the coolant pipe portion extending from the coolant pipe second end toward the coolant pipe first end, the coolant pipe movable between a resting position and a deflected position, in the resting position the coolant pipe portion disposed a first distance from the central axis and disposed on a coolant pipe first axis, in the deflected position the coolant pipe portion disposed a second distance from the central axis and disposed on coolant pipe second axis, the second distance greater than the first distance, the coolant pipe second axis different than the coolant pipe first axis.

20. A toolholder comprising:

a tool body rotatable around a central axis, the tool body having a tool body first end, a tool body second end, a coolant channel, a tool body passageway, and a chamber, the coolant channel extending through a portion of the tool body, the tool body passageway disposed on the tool body second end, the chamber extending from the tool body passageway toward the coolant channel; and a coolant pipe attached to the tool body, the coolant pipe disposed within the chamber and partially disposed within the tool body passageway, the coolant pipe having a coolant pipe first end, a coolant pipe second end, a coolant pipe first opening, a coolant pipe second opening, a coolant pipe passageway, and a coolant pipe portion, the coolant pipe first opening in fluid communication with the coolant channel, the coolant pipe passageway extending from the coolant pipe first opening to the coolant pipe second opening, the coolant pipe portion extending from the coolant pipe second end toward the coolant pipe first end, the coolant pipe movable between a resting position and a deflected position, in the resting position the coolant pipe portion disposed a first distance from the central axis and disposed on a coolant pipe first axis, in the deflected position the coolant pipe portion contacting the tool body, disposed a second distance from the central axis, and disposed on coolant pipe second axis, the second distance greater than the first distance, the coolant pipe second axis different than the coolant pipe first axis and intersecting the central axis.

* * * * *